United States Patent
Xu

(10) Patent No.: US 9,704,490 B2
(45) Date of Patent: Jul. 11, 2017

(54) METHOD FOR DISTRIBUTING VOICE CHANNELS AND A VOICE SYSTEM

(71) Applicant: Tencent Technology (Shenzhen) Company Limited, Shenzhen, Guangdong (CN)

(72) Inventor: Xiaomin Xu, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 14/439,963

(22) PCT Filed: Mar. 14, 2014

(86) PCT No.: PCT/CN2014/073437
§ 371 (c)(1),
(2) Date: Apr. 30, 2015

(87) PCT Pub. No.: WO2014/194706
PCT Pub. Date: Dec. 11, 2014

(65) Prior Publication Data
US 2016/0078871 A1 Mar. 17, 2016

(30) Foreign Application Priority Data
Jun. 8, 2013 (CN) .......................... 2013 1 0228304

(51) Int. Cl.
*G06F 15/173* (2006.01)
*G10L 19/00* (2013.01)
(Continued)

(52) U.S. Cl.
CPC .......... *G10L 19/00* (2013.01); *H04L 65/1046* (2013.01); *H04L 65/80* (2013.01); *H04Q 3/66* (2013.01)

(58) Field of Classification Search
CPC ....... G10L 19/00; H04Q 3/66; H04L 65/1046; H04L 65/80
See application file for complete search history.

(56) References Cited

U.S. PATENT DOCUMENTS 4,726,018 A * 2/1988 Bux ...................... H04L 12/433
370/455
5,570,411 A * 10/1996 Sicher ................... H04W 28/18
455/450

(Continued)

FOREIGN PATENT DOCUMENTS

| CN | 1889526 | 1/2007 |
| CN | 101026556 | 8/2007 |
| CN | 101027879 | 8/2007 |

OTHER PUBLICATIONS

International Search Report issued for PCT/CN/2014/073437 dated Jun. 16, 2014.

*Primary Examiner* — Cheikh Ndiaye
(74) *Attorney, Agent, or Firm* — Colin P. Cahoon; James H. Ortega; Carstens & Cahoon, LLP

(57) ABSTRACT

Provided is a method for distributing voice channels, including: randomly selecting a preset quantity of voice servers at a preset time interval, and distributing at least one token to each of the voice servers selected herein; and said voice servers receiving said tokens, and when receiving uplink voice by any of the voice servers carrying at least one token, the voice server carrying the token processing said uplink voice as a priority. In this way, the channel is preempted by the uplink voice through the token, so that users corresponding to every voice servers have equal probability of acquiring channels; and voice servers will not suffer from channels taken up for a long time due to data being forwarded by other voice servers, thereby saving resources of voice channels. Also provided is a voice system.

4 Claims, 1 Drawing Sheet

(51) Int. Cl.
*H04Q 3/66* (2006.01)
*H04L 29/06* (2006.01)

(56) References Cited

U.S. PATENT DOCUMENTS

| | | | |
|---|---|---|---|
| 7,643,509 B2 * | 1/2010 | Han | H04L 12/413 |
| | | | 370/445 |
| 8,385,888 B2 | 2/2013 | Labrador et al. | |
| 8,780,765 B2 * | 7/2014 | Lv | G10L 19/00 |
| | | | 370/260 |
| 2009/0167841 A1 * | 7/2009 | Wu | H04N 7/15 |
| | | | 348/14.08 |

* cited by examiner

METHOD FOR DISTRIBUTING VOICE CHANNELS AND A VOICE SYSTEM

CROSS-REFERENCE TO RELATED APPLICATIONS

This application is a continuation application of PCT Patent Application No. PCT/CN2014/073437, entitled "A method for Distributing Voice Channels and a Voice System", filed on Mar. 14, 2014, which claims priority to Chinese Application No. 201310228304.9, "A METHOD FOR DISTRIBUTING VOICE CHANNELS AND A VOICE SYSTEM", filed on Jun. 8, 2013, both of which are hereby incorporated by reference in their entirety.

TECHNICAL FIELD

The present disclosure relates to the field of computer technology, and more particularly to a method for distributing voice channels, and a voice system.

BACKGROUND

According to the prior art method for distributing voice channels, since a voice server cannot recognize whether a voice applicant is authorized, each of voice servers needs a centralized processing through a unified server; and before acquiring the processing result from the unified server, the voice server needs to reserve resources of voice channels. When the voice server receives a large amount of voice applications, a lot of waste of resources will be caused.

SUMMARY

In view of the defects mentioned above, in one aspect, the present disclosure provides a method for distributing voice channels, which is capable of saving resources of voice channels.

A method for distributing voice channels includes following steps:

randomly selecting a preset quantity of voice servers at a preset time interval, and distributing at least one token to each of the voice servers selected herein; and receiving said tokens by said voice servers, and when any of the voice servers carrying at least one token receives uplink voice, processing said uplink voice as a priority by the voice server receiving the uplink voice.

In another aspect, the present disclosure provides a voice system which is capable of saving resources of voice channels.

The voice system includes:

a room server, configured to randomly select a preset quantity of voice servers at a preset time interval, and distribute at least one token to each of the voice servers selected herein; and the voice servers, configured to receive said tokens, and when any of voice servers carrying at least token receives uplink voice, the voice server receiving the uplink voice processes said uplink voice as a priority.

According to the method for distributing voice channels and the voice system mentioned above, a preset quantity of voice servers are randomly selected at a preset time interval, and at least one token is distributed to each of the voice servers selected herein; and when any of the voice servers carrying at least one token receives uplink voice, the voice server receiving the uplink voice processes said uplink voice as a priority. In this way, the voice servers do not need a centralized processing through the unified server, but users corresponding to every voice server have equal probability of acquiring channels; and voice servers will not suffer from channels taken up for a long time due to data being forwarded by other voice servers, thereby saving resources of voice channels.

DETAILED DESCRIPTION OF DISCLOSED EMBODIMENTS

In order to make the purpose, technical solutions and advantages of the present disclosure to be understood more clearly, the present disclosure will be described in further details with the accompanying drawings and the following embodiments. It should be understood that the specific embodiments described herein are merely examples to illustrate the invention, not to limit the present disclosure.

Figure 1:
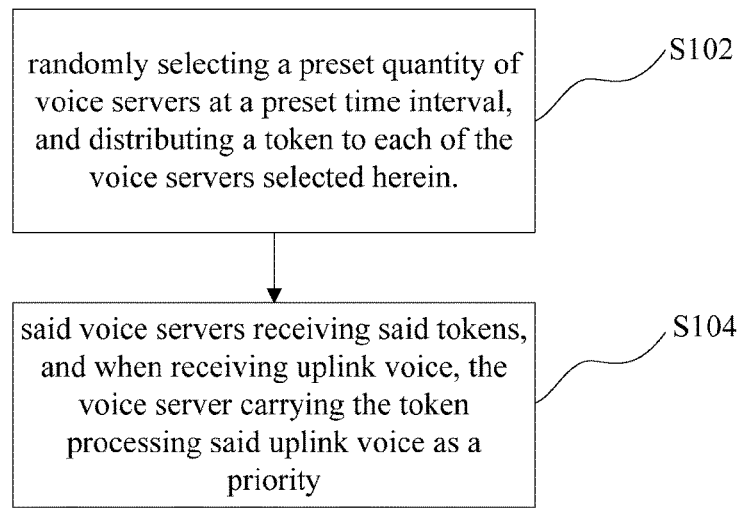
FIG. 1 is a flow diagram illustrating the method for distributing voice channels according to one embodiment of the present invention.

In one embodiment as shown in FIG. 1, a method for distributing voice channels is provided, comprising:

Step 102, randomly selecting a preset quantity of voice servers at a preset time interval, and distributing at least one token to each of the voice servers selected herein.

In this embodiment, the method for distributing voice channels is applied to a voice system containing multiple room servers and multiple voice servers. Wherein, the room server is a server configured to handle the allocation of centralized resources of a room; one room server is designated to one room, and said room server is configured to allocate multiple voice servers to the room, so that, when one of the voice servers receives uplink voice, the uplink voice will be broadcasted, i.e., the uplink voice will be sent to other voice servers, so that, the speech made by the user in the present channel can be heard by other users. Particularly, the room server can randomly select a preset quantity of voice servers at a preset time interval, and distribute at least one token to each of the voice servers selected herein. Each token corresponds to one logic voice channel, i.e., each voice server can be provided with one or more voice channels. Preferably, the preset time interval may be five seconds, the preset quantity may be four, that is to say, there are maximum four voice channels in one room, which means there are maximum four persons permitted to speak simultaneously.

In this embodiment, the room server adopts a pure random algorithm to randomly select voice servers, wherein, the token is a data label, having selected voice servers, the room server distributes the data labels to said voice servers selected herein.

Step 104, receiving said tokens by said voice servers, and when any of the voice servers carrying at least one token receives uplink voice, processing said uplink voice as a priority by the voice server receiving the uplink voice.

In this embodiment, with regard to the voice server carrying the token, when receiving uplink voice, said voice server will process said uplink voice as a priority, which means the voice server will process the voice data uplinked by a terminal as a priority, and broadcast the received voice data to other voice servers.

In this embodiment, since the room server randomly selects voice servers and distributes tokens, and when receiving uplink voice, said voice server carrying the token will process said uplink voice as a priority. In this way, the channel is preempted by the uplink voice through the token, so that users corresponding to every voice server have equal probability of acquiring channels; and voice servers will not suffer from channels taken up for a long time due to data being forwarded by other voice servers, thereby saving resources of voice channels.

In the step 104 according to one embodiment, the step of processing said uplink voice as a priority includes: said voice server receives said uplink voice and broadcast said uplink voice; and the voice data broadcasted carries the token of said voice server. That is to say, when receiving the uplink voice, the voice server carrying the token, broadcasts the uplink voice directly to other voice servers, and the voice data broadcasted herein carries the token of said voice server. In this embodiment, the voice server broadcasts the uplink voice to other voice servers in order that the speech made by the user in the present channel can be heard by other users.

In the step 104 according to one embodiment, the step of processing said uplink voice as a priority includes: said voice server receives the highest priority uplink voice and broadcasts said uplink voice; and said uplink voice data broadcasted herein carries the token carried by said voice server. In this embodiment, multiple levels of priority of the voice data uplinked by multiple terminals, which are connected to the voice servers, can be set. For example, if a user in the current terminal is making a speech, the priority of said speech is higher than the voice data uplinked by other terminals, and the uplink voice corresponding to said speech will be broadcasted to other voice servers as a priority.

Furthermore, in one embodiment, the method for distributing voice channels comprises: said voice server receives said voice data broadcasted herein; and down-links voice data carrying the token, of said voice data received herein, to a terminal. In this embodiment, having received the broadcasted voice data, the voice server only down-links the voice data carrying the tokens to the terminal which is connected to said voice server, thereby ensuring the uniformity of the voice received by other users in the same room.

Furthermore, in one embodiment, said token contains a timestamp recording distributing time of said token; and the process of down-linking the voice data carrying the token, of said voice data received herein, to a terminal comprises: detecting whether said timestamp of said token carried by the voice data received herein, is newer than a timestamp of a token received currently by said voice server; and if said timestamp of said token carried by the voice data received herein is newer than said timestamp of said token received currently by said voice server, said voice data carrying the token is down-linked to a terminal; and said token carried by said voice data is the token carried by the voice sever broadcasting said voice data.

In this embodiment, the room server distributes tokens to voice servers selected randomly, and the distributed token contains a timestamp which recorded the distributing time of said token. Since the room server distributes tokens through network transmission, if there is message delay, the receiving time of tokens by different voice servers will be out of sync. If the voice server detects that the timestamp of said token carried by the voice data received herein is earlier than said timestamp of said token received currently by said voice server, it indicates that the received voice data has expired; said token carried by said voice data is deemed invalid, and said voice data carrying the token will not be down-linked to the terminal. If the voice server detects that the timestamp of said token carried by the voice data received herein is later than said timestamp of said token received currently by said voice server, it indicates that the received voice data is the latest, and then said voice data carrying the token will be down-linked to the terminal. In this embodiment, the expired token data (voice data carrying the token) is prevented from being forwarded by the timestamp effectively, thereby improving the accuracy of distributing voice channels.

A preferred embodiment will be described as follows to illustrate the principle of the method for distributing voice channels mentioned above. In this embodiment, the method for distributing voice channels is applied to a distributed voice system containing multiple room servers and multiple voice servers. To simplify the illustration, a voice system containing one room server and multiple voice servers is taken as an example. Said room server is designated to one room, and said room server is configured to allocate multiple voice servers to this room. Particularly, the room server randomly selects four voice servers every five seconds, and distributes one token for each of selected voice servers, which means there are maximum four users permitted to speak simultaneously. In another embodiment, more than one tokens can be distributed to any one of the selected voice servers. In the selected voice servers, each voice server connects at least one user terminal, when receiving uplink voice, the voice server carrying the token processes said uplink voice (that is, the speech (voice data) made by said user corresponding to the user terminal connected to the voice server) as a priority, and broadcasts the uplink voice received to other voice servers in the same room. In this way, users in the same room can hear the speech made by said user. The broadcasted voice data carries the token of said voice server. Furthermore, having received the broadcasted voice data, other voice servers only down-link the voice data carrying the token to the user terminals which are connected to said voice servers, thereby ensuring the uniformity of the voice received by other users in the same room.

Figure 2:
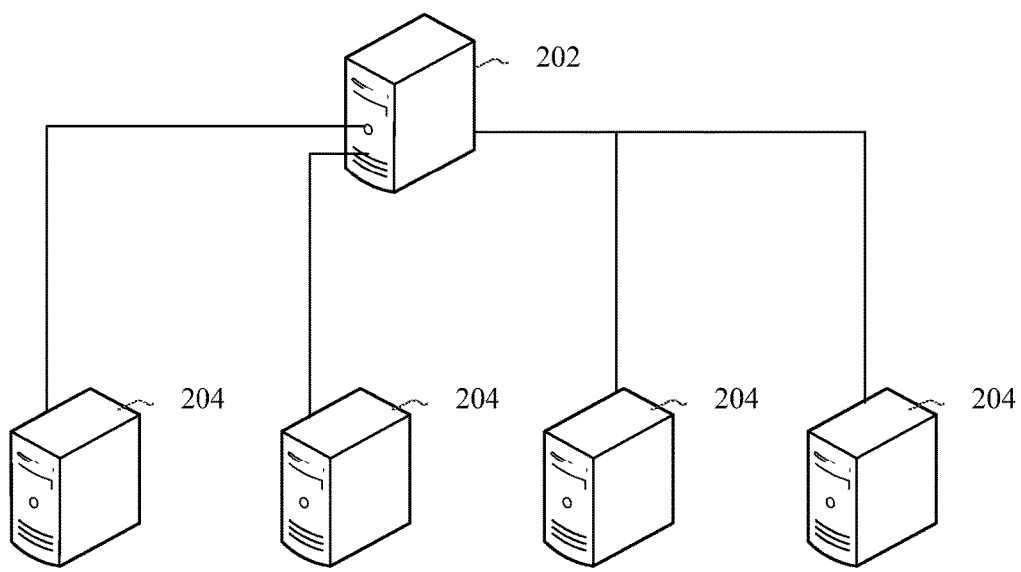
FIG. 2 is structure diagram illustrating the voice system according to one embodiment of the present invention.

In one embodiment as shown in FIG. 2, a voice system is provided, comprising: a room server 202 and voice servers 204. It should be understood that, the voice system provided in the present disclosure is a distributed voice system containing multiple room servers and multiple voice servers. The voice system containing one room server and multiple voice servers in this embodiment is only given as an example for illustration.

Wherein, the room server 202 is configured to randomly select a preset quantity of voice servers 204 at a preset time interval, and distribute a token to each of the selected voice servers 204.

In this embodiment, the room server 202 adopts a pure random algorithm to randomly select voice servers, wherein, the token is a data label, having selected voice servers 204, the room server 202 distributes the data labels to the voice servers 204 herein. Preferably, the preset time interval may be five seconds and the preset quantity of the voice servers may be four, and one token is distributed to each voice server, that is to say, there are maximum four voice channels in one room, which means there are maximum four persons permitted to speak simultaneously.

The voice server 204 is configured to receive a token, and, when receiving uplink voice, the voice server 204 carrying the token processes said uplink voice as a priority.

In this embodiment, with regard to the voice server 204 carrying the token, when receiving the uplink voice, said voice server 204 processes said uplink voice as a priority, which means that the voice server 204 processes voice data uplinked by a terminal as a priority, and broadcasts the received voice data to other voice servers.

In this embodiment, since the room server 202 randomly selects voice servers 204 and distributes tokens, and, when receiving uplink voice, said voice server 204 carrying the token processes said uplink voice as a priority, that is, the channel is preempted by the uplink voice through the token, so that users corresponding to every voice server 204 have equal probability of acquiring channels; and voice servers 204 will not suffer from channels taken up for a long time due to data being forwarded by other voice servers, thereby saving resources of voice channels.

In one embodiment, the voice server 204 is configured to receive the uplink voice and broadcast said uplink voice; and the broadcasted voice data contains the token of the voice server 204 broadcasting said voice data. In this embodiment, the voice server 204 broadcasts the uplink voice to other voice servers in order that the speech made by the user in the present channel can be heard by other users.

In one embodiment, the voice server 204 is configured to receive the highest priority uplink voice and broadcast the uplink voice received; and the broadcasted voice data contains the token of the voice server 204. In this embodiment, multiple levels of priority of the voice data uplinked by multiple terminals, which are connected to the voice server 204, can be preset in advance, for example, if a user in the current terminal is making a speech, the priority of said speech is higher than the voice data uplinked by other terminals.

Furthermore, in one embodiment, the voice server 204 is configured to receive the broadcasted voice data; and down-link the voice data carrying the token, of the voice data received herein, to a terminal. In this embodiment, having received the broadcasted voice data, the voice server only down-links the voice data carrying the token to the terminal, thereby ensuring the uniformity of the voice received by other users in the same room.

Furthermore, in one embodiment, the token contains a timestamp recording distributing time of said token; and the voice server 204 is further configured to detect whether said timestamp of said token carried by the voice data received herein, is newer than the timestamp of the token received currently by said voice server 204; and if said timestamp of said token carried by the voice data received herein is newer than said timestamp of said token received currently by said voice server 204, then the voice server down-links said voice data carrying the token to a terminal; and said token carried by said voice data is the token carried by the voice sever broadcasting said voice data.

In this embodiment, the room server 202 distributes tokens to voice servers 204 selected randomly, and the distributed token contains a timestamp which recorded the distributing time of said token. Since the room server 202 distributes tokens through network transmission, if there is message delay, the receiving time of tokens by different voice servers 204 will be out of sync. If the voice server 204 detects that the timestamp of said token carried by the voice data received herein is earlier than said timestamp of said token received currently by said voice server 204, it indicates that the received voice data has expired; said token carried by said voice data is deemed invalid, and said voice data carrying the token will not be down-linked to the terminal. If the voice server 204 detects that the timestamp of said token carried by the voice data received herein is later than said timestamp of said token received currently by said voice server 204, it indicates that the received voice data is the latest, and then said voice data carrying the token will be down-linked to the terminal. In this embodiment, the expired token data (voice data carrying the token) is prevented from being forwarded by the timestamp effectively, thereby improving the accuracy of distributing voice channels.

It should be understood by those skilled in the art that all or part of the processes of preferred embodiments disclosed above may be realized through relevant hardware commanded by computer program instructions. Said program may be saved in a computer readable storage medium, and said program may include the processes of the preferred embodiments mentioned above when it is executed. Wherein, said storage medium may be a diskette, optical disk, ROM (Read-Only Memory) or RAM (Random Access Memory), and so on.

It should be understood by those skilled in the art that what described above are preferred embodiments of the present disclosure. Various modifications and replacements may be made therein without departing from the theory of the present disclosure, which should also be seen in the scope of the present disclosure.

What is claimed is:

1. A voice system, comprising:
   a room server comprising hardware processor and memory and multiple voice servers comprising hardware processor and memory; wherein,
   a room server configured to randomly select a preset quantity of voice servers at a preset time interval, and distribute at least one token to each of the voice servers selected herein; and
   a plurality of the voice servers configured to receive said at least one token, and when any of said voice servers selected to carry said at least one token receives uplink voice, voice servers other than said voice server receiving the uplink voice receive and broadcast said uplink voice; wherein voice data of said uplink voice broadcasted herein carries a token carried by said voice server receiving the uplink voice, said carried token containing a timestamp recording distributing time of said token; and wherein voice servers other than said voice server receiving the uplink voice receive said voice data broadcasted herein; said voice servers other than said voice server receiving the uplink voice are configured to detect whether said timestamp of said carried token, contained in the voice data received herein, is newer than a timestamp of a carried token received currently by said voice servers other than said voice server receiving the uplink voice; if said timestamp of said token carried by the voice data received herein is newer than said timestamp of said token received currently by said voice servers other than said voice server receiving the uplink voice, said voice data carrying the token is down-linked to a terminal; and said token carried by said voice data is the token carried by the voice sever broadcasting said voice data.

2. The method for distributing voice channels according to claim 1, wherein, said step of processing said uplink voice as a priority by the voice server receiving the uplink voice comprises the following step:
   receiving the highest priority uplink voice and broadcasting said uplink voice;
   and wherein said voice data broadcasted herein carries a token carried by said voice server receiving the uplink voice.

3. A voice system, comprising:

a room server and multiple voice servers; wherein, a room server configured to randomly select a preset quantity of voice servers at a preset time interval, and distribute at least one token to each of the voice servers selected herein; and a plurality of voice servers configured to receive said at least one token, and when any of said voice servers selected to carry said at least one token receives uplink voice, voice servers other than said voice server receiving the uplink voice receive and broadcast said uplink voice; wherein voice data of said uplink voice broadcasted herein carries a token carried by said voice server receiving the uplink voice, said carried token containing a timestamp recording distributing time of said token; and wherein voice servers other than said voice server receiving the uplink voice receive said voice data) broadcasted herein;

said voice servers other than said voice server receiving the uplink voice are configured to detect whether said timestamp of said carried token, contained in the voice data received herein, is newer than a timestamp of a carried token received currently by said voice servers other than said voice server receiving the uplink voice;

if said timestamp of said token carried by the voice data received herein is newer than said timestamp of said token received currently by said voice servers other than said voice server receiving the uplink voice, said voice data carrying the token is down-linked to a terminal; and said token carried by said voice data is the token carried by the voice sever broadcasting said voice data.

4. The voice system according to claim 3, wherein, said voice server receiving the uplink voice receives the highest priority uplink voice and broadcasts said uplink voice; and said voice data broadcasted herein carries the token carried by said voice server receiving the uplink voice.

* * * * *

UNITED STATES PATENT AND TRADEMARK OFFICE
CERTIFICATE OF CORRECTION

PATENT NO.        : 9,704,490 B2
APPLICATION NO.   : 14/439963
DATED             : July 11, 2017
INVENTOR(S)       : Xiaomin Xu It is certified that error appears in the above-identified patent and that said Letters Patent is hereby corrected as shown below:

In the Claims

Claim 1 as issued should be cancelled and the following corrected Claim 1 substituted in its place:
--1. A method for distributing voice channels, comprising the following steps:
randomly selecting a preset quantity of voice servers at a preset time interval, and distributing at least one token to each of the voice servers selected herein by a room server; and
receiving said tokens by said voice servers, and when any of the voice servers carrying at least one token receives uplink voice, receiving and broadcasting said uplink voice, and wherein voice data of said uplink voice processed herein carries a token carried by said voice server receiving the uplink voice, said token containing a timestamp recording distributing time of said token;
receiving, by voice servers other than said voice server receiving uplink voice, said voice data broadcasted herein;
detecting, by voice servers other than said voice server receiving uplink voice, whether said timestamp of said token, contained in the voice data received herein, is newer than a timestamp of a token received currently by said voice servers other than said voice server receiving uplink voice; and
if said timestamp of said token carried by the voice data received herein is newer than said timestamp of said token received currently by said voice servers other than said voice server receiving uplink voice, said voice data carrying the token is down-linked to a terminal; wherein said token carried by said voice data is the token carried by the voice server broadcasting said voice data.--

Claim 3 as issued should be cancelled and the following corrected Claim 3 substituted in its place:
--3. A voice system, comprising:
a room server comprising hardware processor and memory and multiple voice servers comprising hardware processor and memory; wherein,
a room server configured to randomly select a preset quantity of voice servers at a preset time interval, and distribute at least one token to each of the voice servers selected herein; and Page 1 of 2

Signed and Sealed this
Twenty-fourth Day of April, 2018

Andrei Iancu
*Director of the United States Patent and Trademark Office*

CERTIFICATE OF CORRECTION (continued)
U.S. Pat. No. 9,704,490 B2 a plurality of voice servers configured to receive said at least one tokens, and when any of said voice servers selected to carry said at least one token receives uplink voice, voice servers other than said voice server receiving the uplink voice receive and broadcast said uplink voice; wherein voice data of said uplink voice broadcasted herein carries a token carried by said voice server receiving the uplink voice, said carried token containing a timestamp recording distributing time of said token; and wherein voice servers other than said voice server receiving the uplink voice receive said voice data broadcasted herein;

said voice servers other than said voice server receiving the uplink voice are configured to detect whether said timestamp of said carried token, contained in the voice data received herein, is newer than a timestamp of a carried token received currently by said voice servers other than said voice server receiving the uplink voice;

if said timestamp of said token carried by the voice data received herein is newer than said timestamp of said token received currently by said voice servers other than said voice server receiving the uplink voice, said voice data carrying the token is down-linked to a terminal; and said token carried by said voice data is the token carried by the voice server broadcasting said voice data.--